United States Patent [19]

Elias et al.

[11] Patent Number: 4,938,646

[45] Date of Patent: Jul. 3, 1990

[54] ROUND BALE LOADER AND CARRIER

[76] Inventors: John Elias, Box 355; Donald Cruikshank, Box 87, both of Miami, Manitoba, Canada, R0G 1H0

[21] Appl. No.: 260,002

[22] Filed: Oct. 19, 1988

[30] Foreign Application Priority Data

Oct. 22, 1987 [CA] Canada ................................. 549941

[51] Int. Cl.⁵ ............................................. A01D 90/02
[52] U.S. Cl. .................... 414/24.5; 414/501; 414/111
[58] Field of Search ............. 414/24.5, 24.6, 495, 414/501, 540, 543, 111

[56] References Cited

U.S. PATENT DOCUMENTS

| | | |
|---|---|---|
| 2,672,808 | 3/1954 | Eldert . |
| 3,410,569 | 11/1968 | Blake . |
| 3,499,550 | 3/1970 | Jensen . |
| 3,924,757 | 12/1975 | Meyer . |
| 4,063,745 | 12/1977 | Olson ........................... 280/43.23 |
| 4,117,940 | 10/1978 | Adam ........................... 414/501 X |
| 4,204,789 | 5/1980 | Parks, Jr. ....................... 414/24.5 |
| 4,249,842 | 2/1981 | Johnson ......................... 414/24.5 |
| 4,259,034 | 3/1981 | Ward et al. .................... 414/501 X |
| 4,261,676 | 4/1981 | Balling, Sr. .................... 414/24.5 |
| 4,370,796 | 2/1983 | Wilson .......................... 414/501 X |
| 4,508,359 | 4/1985 | Campbell et al. ............... 414/24.5 |
| 4,594,041 | 6/1986 | Hostetler ....................... 414/24.5 |

FOREIGN PATENT DOCUMENTS

| | | | |
|---|---|---|---|
| 1086688 | 9/1980 | Canada .......................... | 414/24.5 |
| 2821991 | 11/1979 | Fed. Rep. of Germany ..... | 414/24.5 |
| 2044722 | 10/1980 | United Kingdom ............ | 414/24.5 |
| 2136766 | 9/1984 | United Kingdom ............ | 414/24.5 |
| 2179624 | 3/1987 | United Kingdom ............ | 414/24.6 |

*Primary Examiner*—Robert J. Spar
*Assistant Examiner*—William M. Hienz
*Attorney, Agent, or Firm*—Irell & Manella

[57] ABSTRACT

A bale carrier or accumulator includes a cradle assembly to receive a bale transversely over the front of the carrier or accumulator which may be pulled immediately behind a baler, and then swing the bale through 90° so that it lies longitudinally relative to the carrier or accumulator. The bale is then engaged upon the ground so that when the carrier or accumulator is moved forwardly with the baler, pickup rails engage under the rounded sides of the bale and elevate it as the carrier or accumulator is raised to the transport position, with the bale ready to be moved rearwardly along the rails by the next succeeding bale ejected from the baler machine.

10 Claims, 3 Drawing Sheets

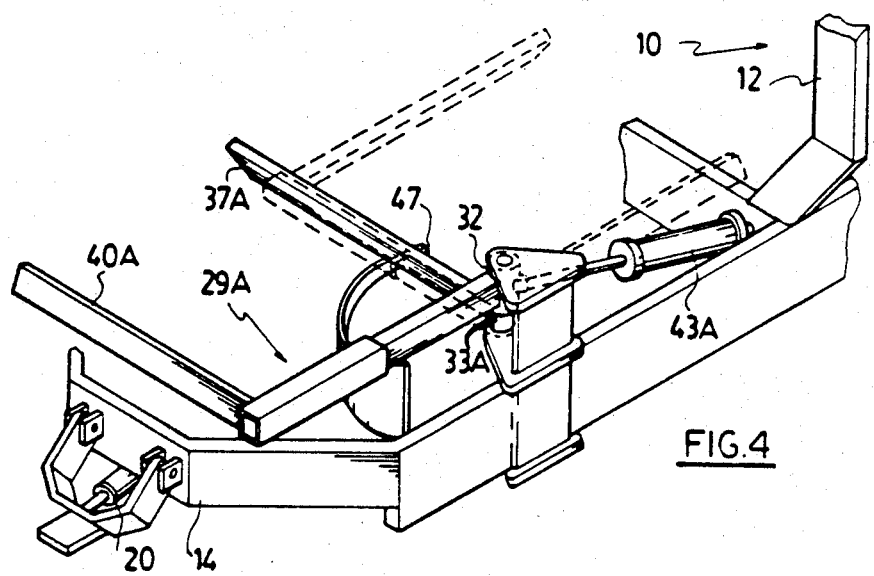
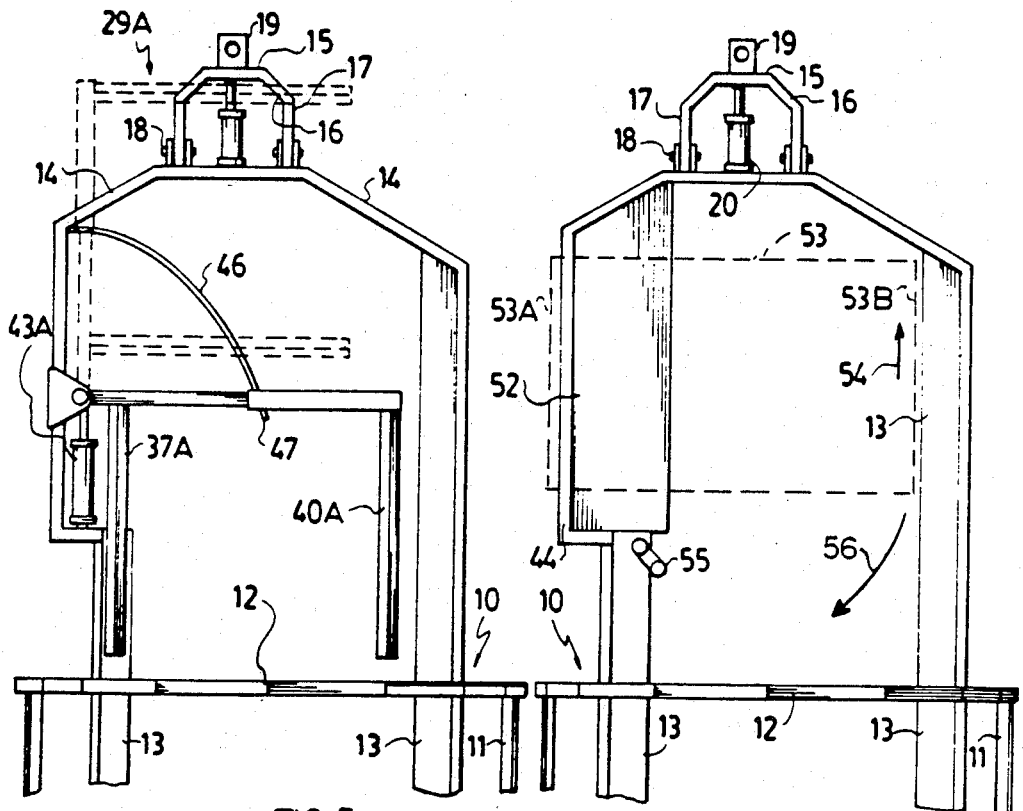
FIG. 4
FIG. 5
FIG. 9

ROUND BALE LOADER AND CARRIER

BACKGROUND OF THE INVENTION

This invention relates to new and useful improvements in carriers or accumulators for round bales, the term carrier including accumulators and other round bale transporting devices.

Conventionally, round bales are ejected transversely from the baling machine so that they cannot be loaded directly to a longitudinally extending carrier. Rather, they are ejected upon the ground whereby the carrier then engages the bale axially or by means of a fork, longitudinally upon one side of the carrier whereupon it is swung upwardly and over and deposited upon the carrier in a longitudinal position.

Alternatively, a separate pickup device is utilized and manipulated so that the bale can be deposited in the right orientation to be received by the carrier rails.

All of this requires additional equipment and manpower and is extremely time consuming and not very cost effective.

PRIOR ART

Prior art known to the applicants include the following:

U.S. Pat. No. 2,672,808, R. D. Eldert, Mar. 23, 1954. This shows a baler attachment adapted to roll hay or straw into a round bale formation and store it rearwardly.

U.S. Pat. No. 3,410,569, F. W. Blake, Nov. 12, 1968. This shows a caster-wheeled farm cart and is not of any particular relevance.

U.S. Pat. No. 3,499,550, D. A. Jensen, Mar. 10, 1970. This shows a bale accumulator designed primarily for cubicle type bales usable to group and stack bales of hay so that a bale loader and stacker attachment may be used to pick up and stack the bales.

U.S. Pat. No. 3,924,757, Frank A. Meyer, Dec. 9, 1975. This shows a bale accumulator adapted to receive bales formed by a hay baler and includes two pairs of chutes with a common entrance for receiving individual bales discharged from the baler into the carrier.

U.S. Pat. No. 4,063,745, LeRoy C. Olson, Dec. 20, 1977. This shows a farm trailer with the bed being articulated into a plurality of sections for relative pivotal movement.

U.S Pat. No. 4,261,676, Bernard L. Balling, Sr., Apr. 14, 1981. This shows a round bale carrier having an elongated base frame work with side loading bales with a side bale loader and a pusher arm for moving the bales rearwardly within the bed.

U.S. Pat. No. 4,508,359, Willis R. Campbell et al., Apr. 2, 1985. This shows a latch for the draft member of a bale handler having an elongated draft member pivotally connected to one end of the side rail of the frame and including a latch to secure the draft member in transport position.

The present invention overcomes these disadvantages by providing a carrier which can be pulled directly behind a baler and which receives a round bale in a transverse position over the front end of the carrier and then turns it longitudinally so that it is in a position to be picked up by the spaced and parallel longitudinally extending glide rails normally provided.

Normally, the baler has to stop forward movement when ejecting and the present improvement takes advantage of this as will hereinafter be described. However, it is of course possible to adapt the improvement to the carrier assembly so that it can receive and handle bales while moving continuously.

The principal object of the present invention is to provide a cradle assembly which receives a bale over the front end of the carrier in a transverse position and then turns it longitudinally and then deposits it upon the ground whereupon continued forward movement of the carrier will enable it to be picked up by the glide rails and elevated and moved rearwardly a predetermined amount. This is accomplished by raising and lowering mechanism associated with the ground supporting wheels of the carrier and as each succeeding bale is picked up, it moves the other bales rearwardly along the guide rails. In accordance with the invention there is provided, in a bale carrier which includes a longitudinally extending open chassis, ground engaging wheels supporting said chassis intermediate the ends thereof, means to raise and lower said chassis relative to the wheels from a bale pickup and discharge position to a transport position and vice versa, a pair of bale receiving glide rails mounted in said chassis in spaced and parallel longitudinally extending relationship and hitch means on the front of said chassis for attachment behind a conventional round baler assembly; the improvement which comprises a bale receiving cradle assembly mounted at the front of said chassis for receiving bales over the front of said chassis from the associated baler, in a transverse position relative to said chassis and means associated with said cradle to swing said bale through substantially 90° in a horizontal plane whereby said bale is in a longitudinal position relative to said glide means, and to engage said bale with the ground by moving said chassis to the bale pickup position whereby when said chassis is moved forwardly and moved to the transport position, the bale is picked up by said glide rails and moved rearwardly an incremental amount.

Another aspect of the invention is to provide a bale carrier which comprises in combination a longitudinally extending open chassis, ground engaging wheels supporting said chassis intermediate the ends thereof, means to raise and lower said chassis relative to the wheels, from a bale pickup and discharge position to a transport position and vice versa, a pair of bale receiving glide rails mounted on said chassis in spaced and parallel longitudinally extending relationship, hitch means on the front of said chassis operatively connecting said chassis to an associated baler, a bale receiving cradle assembly mounted at the front of said chassis.

Another advantage of the present invention is that the bales can be unloaded by lowering the carrier so that the undersides of the bales engage the ground between the glide rails, whereupon the carrier is moved forwardly so that the bales remain stationary and the entire carrier is moved clear therefrom.

If the bales require to be picked up from the ground, the carrier can be lowered to the pickup and discharge position and backed against one or more bales lying longitudinally whereupon they are engaged by the glide rails and the raising of the carrier to the transport position elevates the bales onto the glide rails and clear of the ground.

A further advantage of the invention is to provide a structure which is easily adapted for use with existing carriers or accumulators or, alternatively, can of course be incorporated during the manufacture of the carriers or accumulators.

A still further advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 4 is a partially schematic side elevation of an alternative embodiment of the improvement.

FIG. 5 is a top plan view of FIG. 4.

FIG. 9 is a partially schematic top plan view of a still further embodiment.

In the drawings like characters of reference indicate corresponding parts in the different figures.

DETAILED DESCRIPTION

Figure 2:
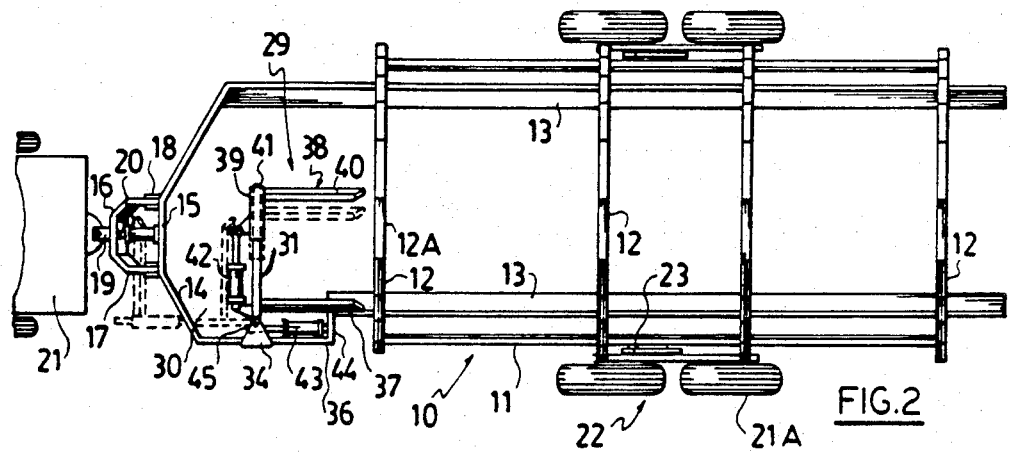
FIG. 2 is a plan view of FIG. 1.
Figure 1:
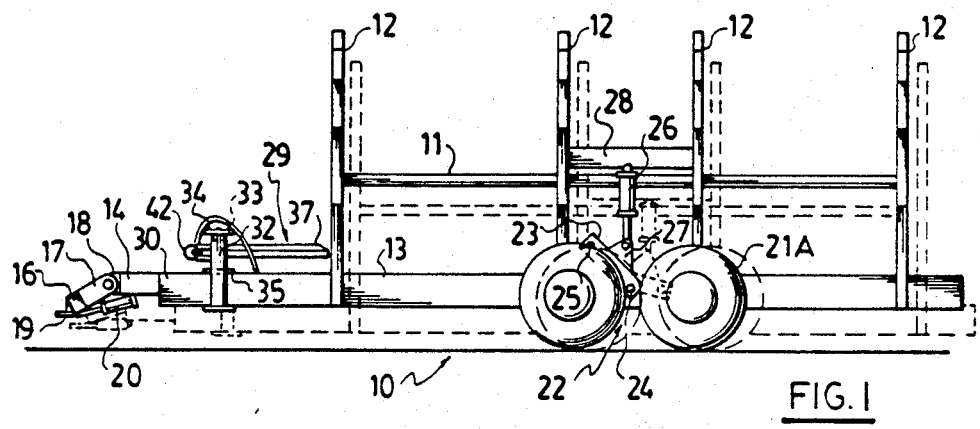
FIG. 1 is a side elevation of a round bale carrier with the preferred embodiment of the invention incorporated therein.
Figure 3:
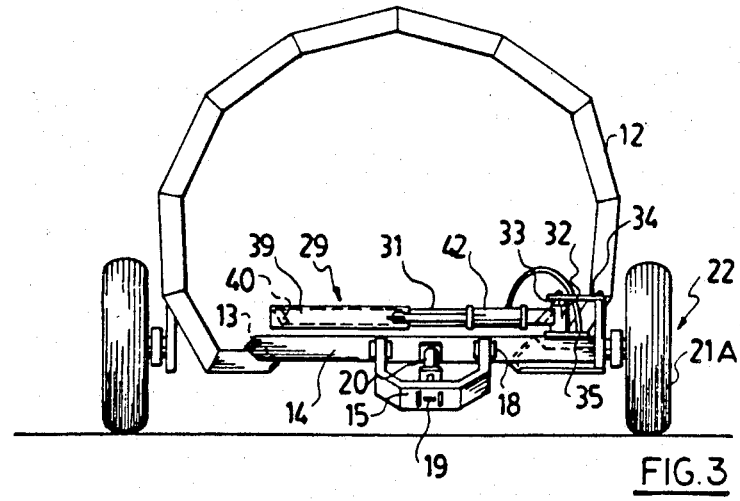
FIG. 3 is a front end view of FIG. 1.

Proceeding therefore to describe the invention in detail, reference should first be made to FIGS. 1, 2 and 3 in which 10 illustrates generally a longitudinally extending chassis including a pair of longitudinally extending chassis side members 11 supporting a plurality of overspanning transversely extending hoops 12 and a pair of spaced and parallel glide rails 13 designed to receive and support one or more round bales in longitudinal relationship relative to the chassis.

The front end 14 of the chassis includes a front transverse member 15 from which a hitch assembly 16 extends. This hitch assembly includes the spaced and parallel longitudinal members 17 pivoted for movement in a horizontal plane, by means of transverse pivots 18 and having a conventional hitch plate 19 on the front thereof.

A fluid operator consisting of a piston and cylinder assembly 20 reacts between the front channel members 14 or 15 and the hitch so that it can be raised and lowered as will hereinafter be described. A conventional round baler shown schematically at 21 is connected to the hitch plate 19 in a conventional manner and in turn may be hitched to a conventional swath pickup device (not illustrated) or the like.

The aforementioned chassis 10 is supported upon ground engaging wheels 21 forming part of a walking beam assembly collectively designated 22 with each pair of side wheels being pivotally connected to the chassis by means of pivot links 23, the links being pivotally connected to the centre of the walking beam as at 24 and to the chassis as at 25. A fluid operator comprising a piston and cylinder assembly 26 is operatively connected to a lug plate 27 intermediate the ends of the link 23 and a cross chassis member 28 so that extension and contraction of the fluid operator raises and lowers the chassis from a transport position shown in full line in FIG. 1 to a loading and unloading position shown in phantom in FIG. 1 and vice versa.

A bale receiving cradle assembly collectively designated 29 is situated in the front end portion 30 of the carrier or accumulator between the glide rails 13 and in the preferred embodiment, it consists of a bale receiving arm 31 preferably of square cross section mounted by the inner end thereof to a relatively large diameter bearing sleeve 32 which in turn engages a relatively large diameter vertically situated pivot pin 33 mounted between support plates 34 and 35 which in turn are secured to one side member of the chassis which incorporates deep channel framing 36 for bale support loads.

In the preferred embodiment, a fixed base support bar 37 constitutes an inner bar and extends perpendicularly from the arm 31 and adjacent the point of pivotal connection thereof to the frame.

An outer or movable bale support bar collectively designated 38 includes a sleeve 39 telescopically engaging over the arm 1 and having an outer bale support bar 40 extending perpendicularly from the distal end 41 of the sleeve so that the two bars 37 and 40 are in spaced and parallel relationship and in a substantially horizontal plane.

A fluid operator taking the form of a piston and cylinder assembly 42 is operatively connected between the arm 31 adjacent the inner end thereof and adjacent the inner end of sleeve 39 so that extension and retraction of this piston and cylinder assembly 42 opens and closes the bar 40 relative to the bar 37 and in FIG. 2, this range of movement is shown in solid line when the bar 40 is in the outermost position and in phantom when it is in the innermost position.

A further fluid operator takes the form of a piston and cylinder assembly 43 and extends between a frame member 44 and an off-standing lug 45 secured to the pivot sleeve 32 so that extension and retraction of this piston and cylinder assembly will swing the entire cradle assembly from the longitudinal position shown in full line in FIG. 2 to the base receiving position shown in phantom in FIG. 2 and it will be noted that when in the bale receiving position, the outer bar 40 is adjacent the front end of the hitch 16 so that a base ejected from the baler will be deposited upon the bars 37 and 40 which, under these conditions, are in the retracted position illustrated in phantom in FIG. 2.

The baler normally must stop forward movement when ejecting a round bale which is received in a transverse orientation relative to the longitudinally extending chassis 10.

Once received in the cradle, the piston and cylinder assembly 43 is extended thus moving the cradle assembly to the position shown in full lines in FIG. 2 so that the bale is now positioned longitudinally between the glide rails 13.

The other piston and cylinder assembly 42 is now extended and at the same time the chassis is moved to the position shown in phantom in FIGS. 1, by operation of the piston and cylinder assemblies 26.

Figure 10:
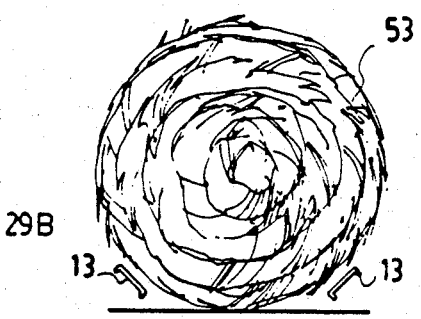
FIG. 10 is a schematic end view showing the glide rails in the bale pickup or discharge position.

The lowering of the chassis to the loading and unloading position shown in phantom in FIG. 1 causes the bale to engage the ground clear of the glide rails 13 as shown schematically in FIG. 10.

Figure 11:
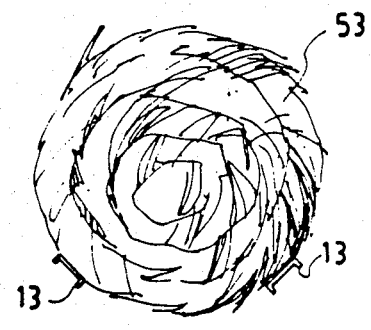
FIG. 11 is a view similar to FIG. 10 but showing a bale and glide rails in the transport position.

Forward movement of the carrier and baler together with the raising of the chassis to the transport position shown in solid lines in FIG. 1, causes the glide rails to engage under the rounded sides of the bale and to elevate same clear of the ground to a position shown schematically in FIG. 11 it being understood that the bale has been moved back along the glide rails clear of the front overspanning hoop member specifically designated 12A.

The process is repeated with the next succeeding bale engaging the front of the first mentioned bale and moving it further back along the glide rails. This process is continued until the glide rails are full of round bales supported longitudinally therealong.

To unload the bales, the piston and cylinder assembly 26 is actuated to lower the chassis to the position shown in phantom in FIG. 1 thus causing the undersides of the bales to engage the ground and to relieve the weight thereof from the glide rails. Forward movement of the carrier will withdraw the carrier from the lowered bales which remain upon the ground, it being understood that the space between the longitudinally extending glide rails is clear and open with the glide rails being supported by the overspanning hoop members 12.

If it is desired to pick up bales from the ground, whether the bales be single or in a longitudinally extending row, the chassis is lowered to the position shown in phantom in FIG. 1 and reversed so that the glide rails engage underneath the rounded sides of the bales similar to that shown schematically in FIG. 10. When the chassis has been backed the desired amount, the piston and cylinder assembly 26 is operated to raise the chassis to the position shown in full line in FIG. 1 thus lifting the bales clear of the ground to the position shown schematically in FIG. 11.

FIGS. 5 through 9 show alternative embodiments of the cradle assembly and dealing first with the embodiment shown in FIGS. 4 and 5, the cradle assembly collectively designated 29A is similar to that hereinbefore described except that the sleeve 32A engages upon a pivot pin 33A which is of a sufficient height to enable the cradle to move vertically as well as swing in a 90° arc. It is actuated by a piston and cylinder assembly 43A in a manner similar to that hereinbefore described, the only exception being the provision of a lowering rail 46 which is secured by the front end thereof to chassis member 14 adjacent the front thereof and curves rearwardly to a position indicated by reference character 47. At the same time it extends downwardly as clearly shown in FIG. 4 so that as the carrier rotates through 90° the bale is lowered to the ground with the carrier not only rotating through 90° from the position shown in phantom in FIG. 2 to the full line position of FIG. 2, but also is lowered upon the standard or pivot pin 33A so that the bale engages the ground when in the longitudinally extending position.

From thereon, of course, the operation of the device is similar to that described for the first embodiment.

Figure 6:
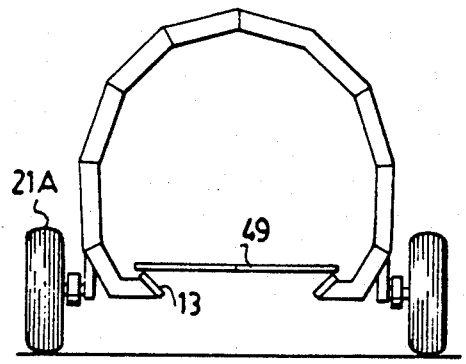
FIG. 6 is a rear view, partially schematic, of a further embodiment.
Figure 7:
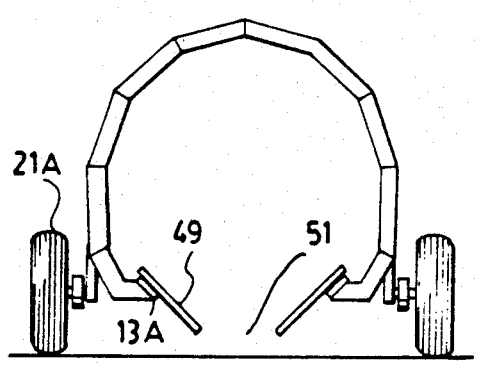
FIG. 7 is a view similar to FIG. 6 but with the table in the opened position.
Figure 8:
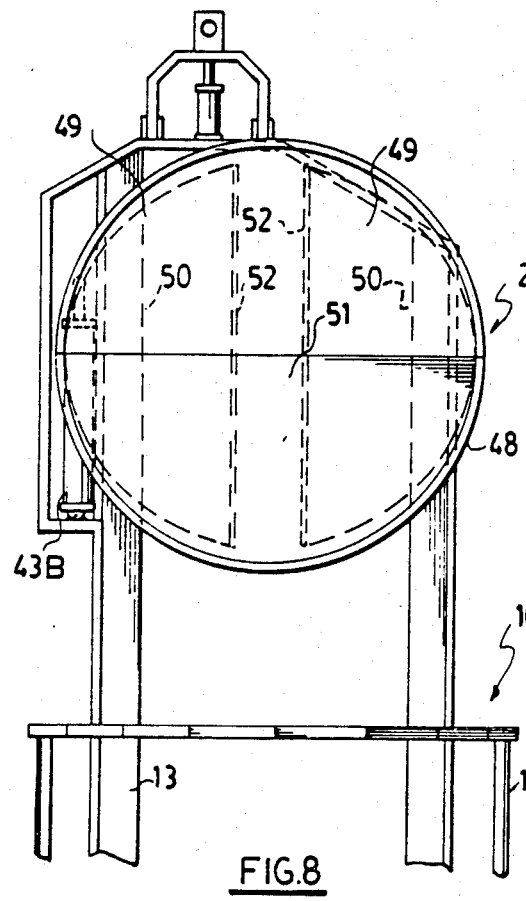
FIG. 8 is a top plan view of FIG. 7.

FIGS. 6, 7 and 8 show a further alternative construction in which the cradle includes a circular or cylindrical ring 48 mounted for rotation within the front of the chassis and being rotated through approximately 90° by piston and cylinder assembly 43B. The ring is supported upon a frame member (not illustrated) and includes a pair of semicircular table or plate halves 49 which are pivoted for partial rotation within the ring 48 along a line substantially equal to the lines shown in phantom by reference character in FIG. 8. These are camming members which normally maintain the plates in the uppermost position shown in FIG. 6 with the separation 51 between the diametrical edges 52 of the plates being transversely of the chassis.

However, as the plate is rotated throughout substantially 90°, the cam members permit the plates to tip the position shown in FIG. 7.

If a bale is deposited upon the plates when in the position of FIG. 6 and then rotated through 90°, the bale not only moves from the transverse to the longitudinal positions, but will move downwardly until it engages the ground whereupon the pickup action of the glide plates is the same at that hereinbefore described.

Finally, reference should be made to FIG. 9 which includes a fixed plate 52 situated on one side of the chassis 11 supported by structure 44 and which receives the bale 53 shown in phantom, in a transverse position with one end of the bale being supported by plate 52 and the other end engaging the ground.

As the carrier is moved forwardly in the direction of arrow 54, a stop plate 55 prevents rearward movement of the end 53A of the bale with the other end 53B being pulled in the direction of arrow 56 until it is longitudinally between the glide rails 13 and can be picked up in a manner hereinbefore described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. In a bale carrier which includes a longitudinally extending open chassis, ground engaging wheels supporting said chassis intermediate the ends thereof, means to raise and lower said chassis relative to the wheels from a bale pickup and discharge position to a transport position and vice versa, a pair of bale receiving glide rails mounted in said chassis in spaced and parallel longitudinally extending relationship and hitch means on the front of said chassis for attachment behind a conventional round baler assembly; the improvement which comprises a bale receiving cradle assembly mounted at the front of said chassis for directly receiving bales over the front of said chassis from the associated baler, whereby the longitudinal axis of the directly deposited bale is in a transverse position relative to said chassis, said cradle assembly being moveable from a transverse bale receiving position at the front of said chassis and within the confines thereof to a longitudinal bale transfer position within the confines thereof and vice versa, means associated with said cradle assembly to substantially horizontally swing said bale through substantially 90° whereby the longitudinal axis of said bale is substantially parallel to said glide rails after said swinging, and means to engage said bale with the ground within the confines of the chassis, after said swinging, by moving said chassis to the bale pickup position whereby when said chassis is moved forwardly and moved to the transport position, the ground-engaged bale is moved rearwardly an incremental amount relative to said chassis, and picked up by said glide rails.

2. The improvement according to claim 1 in which said cradle assembly includes a bale receiving arm pivotally mounted for movement in a substantially horizontal plane, on one side of said chassis adjacent the front end thereof, an inner bale support bar extending perpendicularly from said receiving arm, adjacent the pivotal mounting thereof, an outer bale support bar extending perpendicular from said receiving arm adjacent the other end thereon and being substantially parallel to said inner bar, said bars lying in said substantially horizontal plane, and fluid operated means to substantially horizontally swing said cradle assembly through substantially 90°.

3. The improvement according to claim 2 in which said inner bale support bar is fixed and said outer bale support bar is movable relative to said inner bar, said movable outer support bar including means mounting same to said receiving arm in telescopic relationship for movement towards and away from said fixed bar between an inner bale supporting position and an outer position whereby said bale is released when said cradle is in said bale transfer position and fluid operating means to move said movable bar relative to said fixed bar.

4. The improvement according to claim 1 in which said hitch means is pivoted transversely to the front of said chassis and includes fluid operated means extending between said chassis and said hitch means to pivot said hitch means as said chassis is moved from the bale pickup and discharge position to the bale transport position and vice versa.

5. The improvement according to claim 1 in which a next succeeding bale picked up by said glide rails moves said first mentioned bale, rearwardly along said guide rails.

6. The combination of a round baler and a bale carrier comprising a longitudinally extending open chassis, ground engaging wheels supporting said chassis intermediate the ends thereof, means to raise and lower said chassis relative to the wheels, from a bale pickup and discharge position to a transport position and vice versa, a pair of bale receiving glide rails mounted on said chassis in spaced and parallel longitudinally extending relationship, hitch means on the front of said chassis operatively connected said chassis to an associated baler, a bale receiving cradle assembly mounted at the front of said chassis for directly receiving bales over the front of said chassis from the associated baler, whereby the longitudinal axis of the directly deposited bale is in a transverse position relative to said chassis, means associated with said cradle to substantially horizontally swing said bale through substantially 90° whereby the longitudinal axis of said bale is substantially parallel to said glide rails after said swinging means, to engage said bale with the ground within the confines of the chassis, after said swinging, by moving said chassis to the bale pickup position whereby when said chassis is moved forwardly and moved to the transport position, the ground engaged bale is moved rearwardly an incremental amount relative to said chassis, and picked up by said glide rails.

7. The bale carrier according to claim 6 in which said cradle assembly includes a bale receiving arm pivotally mounted for movement in a substantially horizontal plane, on one side of said chassis adjacent the front end thereof, an inner bale support bar extending perpendicularly from said receiving arm, adjacent the pivotal mounting thereof, an outer bale support bar extending perpendicular from said receiving arm adjacent the other end thereon and being substantially parallel to said inner bar, said bars lying in said substantially horizontal plane, and fluid operated means to substantially horizontally swing said cradle assembly through substantially 90°.

8. The bale carrier according to claim 7 in which said inner bale support bar is fixed and said outer bale support bar is movable relative to said inner bar, said movable outer support bar including means mounting same to said receiving arm in telescopic relationship for movement towards and away from said fixed bar between an inner bale supporting position and an outer position whereby said bale is released after said swinging and fluid operating means to move said movable bar relative to said fixed bar.

9. The bale carrier according to claim 6 in which said hitch means is pivoted transversely to the front of said chassis and includes fluid operated means extending between said chassis and said hitch means to pivot said hitch means as said chassis is moved from the bale pickup and discharge position to the bale transport position and vice versa.

10. The bale carrier according to claim 6 in which a next succeeding bale picked up by said glide rails moves said first mentioned bale, rearwardly along said guide rails.

* * * * *